(12) United States Patent
Ribeiro et al.

(10) Patent No.: US 10,831,719 B2
(45) Date of Patent: Nov. 10, 2020

(54) FILE CONSISTENCY IN SHARED STORAGE USING PARTIAL-EDIT FILES

(71) Applicant: Western Digital Technologies, Inc., San Jose, CA (US)

(72) Inventors: Gabriel Ribeiro, San Francisco, CA (US); Jonathan Gaillard, San Francisco, CA (US); Sailesh Rachabathuni, Santa Clara, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 390 days.

(21) Appl. No.: 15/689,427

(22) Filed: Aug. 29, 2017

(65) Prior Publication Data

US 2019/0065526 A1 Feb. 28, 2019

(51) Int. Cl.
| | |
|---|---|
| *G06F 7/00* | (2006.01) |
| *G06F 16/182* | (2019.01) |
| *G11B 27/02* | (2006.01) |
| *G06F 16/176* | (2019.01) |
| *G06F 16/178* | (2019.01) |
| *G06F 21/62* | (2013.01) |

(52) U.S. Cl.
CPC .......... *G06F 16/183* (2019.01); *G06F 16/176* (2019.01); *G06F 16/178* (2019.01); *G06F 16/1824* (2019.01); *G06F 21/6218* (2013.01); *G11B 27/02* (2013.01); *G06F 16/1774* (2019.01)

(58) Field of Classification Search
CPC .............. G06F 16/183; G06F 16/1774; G06F 21/6218; G06F 16/1824; G06F 16/176; G06F 16/178; G11B 27/02

USPC ................................. 707/827, 822, 831, 704
See application file for complete search history.

(56) References Cited

U.S. PATENT DOCUMENTS

| | | | | |
|---|---|---|---|---|
| 5,551,046 A | * | 8/1996 | Mohan ....................... | G06F 9/52 |
| 5,948,062 A | * | 9/1999 | Tzelnic ............... | G06F 11/1435 709/219 |
| 5,953,419 A | * | 9/1999 | Lohstroh ............. | G06F 21/6209 380/278 |
| 7,415,488 B1 | * | 8/2008 | Muth ................... | G06F 11/2082 707/648 |
| 7,617,259 B1 | * | 11/2009 | Muth ................... | G06F 11/2058 |

(Continued)

OTHER PUBLICATIONS

International Search Report dated Jul. 26, 2018 for PCT/US2018/035903.

(Continued)

*Primary Examiner* — Mohammed R Uddin
(74) *Attorney, Agent, or Firm* — Chang & Hale LLP

(57) ABSTRACT

Systems and methods are disclosed for managing partial-edit files for shared storage applications. A network-attached storage device (NAS) includes a non-volatile memory module, a network interface, and control circuitry configured to connect to a first client over a network connection using the network interface, receive, from the first client, a request to access a first portion of an existing file stored in the non-volatile memory module, create a first partial-edit file based on the existing file, receive modifications associated with the first portion of the existing file from the first client, modify the first partial-edit file according to the received modifications, and at least partially overwrite the existing file with at least a portion of the first partial-edit file.

24 Claims, 5 Drawing Sheets

(56) References Cited

U.S. PATENT DOCUMENTS

| | | | |
|---|---|---|---|
| 8,121,990 B1* | 2/2012 | Chapweske | G06F 16/178 707/695 |
| 8,375,124 B1 | 2/2013 | Schwartz | |
| 8,700,727 B1* | 4/2014 | Gole | H04L 67/104 709/213 |
| 8,972,345 B1* | 3/2015 | Aguilera | G06F 16/182 707/615 |
| 9,213,717 B1* | 12/2015 | Pawar | G06F 16/1774 |
| 2002/0188667 A1* | 12/2002 | Kirnos | G06F 16/1787 709/203 |
| 2006/0010177 A1* | 1/2006 | Kodama | G06F 16/1827 |
| 2006/0020636 A1* | 1/2006 | Murotani | G06F 16/10 |
| 2006/0277226 A1* | 12/2006 | Chikusa | G06F 16/10 |
| 2008/0208927 A1* | 8/2008 | Chikusa | G06F 3/0605 |
| 2009/0320119 A1* | 12/2009 | Hicks | G06F 16/958 726/9 |
| 2012/0221609 A1* | 8/2012 | Boor | G06F 16/29 707/822 |
| 2013/0036092 A1* | 2/2013 | Lafont | G06F 16/178 707/634 |
| 2013/0124638 A1 | 5/2013 | Barreto et al. | |
| 2013/0226872 A1* | 8/2013 | Barefoot | G06F 16/27 707/638 |
| 2013/0238553 A1* | 9/2013 | Kim | G06F 11/14 707/610 |
| 2013/0304706 A1* | 11/2013 | MacInnis | G06F 11/2094 707/658 |
| 2014/0222758 A1* | 8/2014 | March | G06F 16/1873 707/638 |
| 2015/0186668 A1* | 7/2015 | Whaley | G06F 16/16 713/156 |
| 2015/0324386 A1 | 11/2015 | Calder et al. | |
| 2015/0356110 A1* | 12/2015 | Lin | G06F 16/1774 707/704 |
| 2015/0370827 A1* | 12/2015 | Parkison | G06F 16/1844 707/626 |
| 2016/0154817 A1* | 6/2016 | Mason, Jr. | G06F 16/1827 707/704 |
| 2017/0060936 A1* | 3/2017 | Gammans | G06F 16/1787 |
| 2017/0308598 A1* | 10/2017 | Goldberg | G06F 16/27 |
| 2018/0089224 A1* | 3/2018 | Muthuswamy | H04L 67/1097 |
| 2018/0107455 A1* | 4/2018 | Psistakis | G06F 8/20 |

OTHER PUBLICATIONS

Written Opinion of ISA dated Jul. 26, 2018 for PCT/US2018/035903.

\* cited by examiner

FILE CONSISTENCY IN SHARED STORAGE USING PARTIAL-EDIT FILES

BACKGROUND

Field

This disclosure relates to data storage systems. More particularly, the disclosure relates to systems and methods for managing shared data storage.

Description of Related Art

Network-attached storage devices provide access to data over computer networks. Where data storage of a network-attached storage device is shared among a plurality of clients, consistency in modification of shared files can be important.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

Disclosed herein are systems, devices, and methods for promoting file consistency in shared storage systems using partial-edit files, which may allow for concurrent random modifications of files in a network-attached data storage server file system without the use of distributed locks, while preserving application-level consistency across multiple edits/modifications to files in the file system. For example, when a client wishes to edit an existing file in a file system of a data storage server, a partial-edit file may be created and stored outside of the file system, wherein the client may execute modifications in the partial-edit file. When the client is done modifying the partial-edit file, the client may commit the modified partial-edit file to the file system. The commit operation may automatically update the original file with the modified partial-edit file, in part or in whole. For example, in some embodiments, only the file content of the original file is updated. The partial-edit file may then be deleted.

In situations in which multiple clients modify the same base file through generation and modification of separate partial-edit files based thereon, modifications from one client are not mixed with modifications of another client, due at least in part to the nature of the commit operation, which may involve the overwriting of the original file with a complete partial-edit file comprising modifications from only a single client. In some implementations, clients may have the option to commit modifications only if a file version precondition is satisfied, thus preventing modifications being applied in situations where another client has modified the same file in the interim period since the client's partial-edit file was created. Although the principles disclosed herein may be applicable to any suitable or practical data storage system or environment, for convenience, certain embodiments are disclosed herein in the context of network-attached storage systems.

Network-Attached Storage

Network-attached storage (NAS) drives/systems can provide file-level, or object-level, data storage over a computer network, wherein access to the stored data is accessible to one or more clients. Although certain embodiments are disclosed herein in the context of files, file servers, file systems, and other file-level references, it should be understood that such references, as used herein, may refer to object-level data, or any other type of data structure, depending on the implementation.

Figure 1:
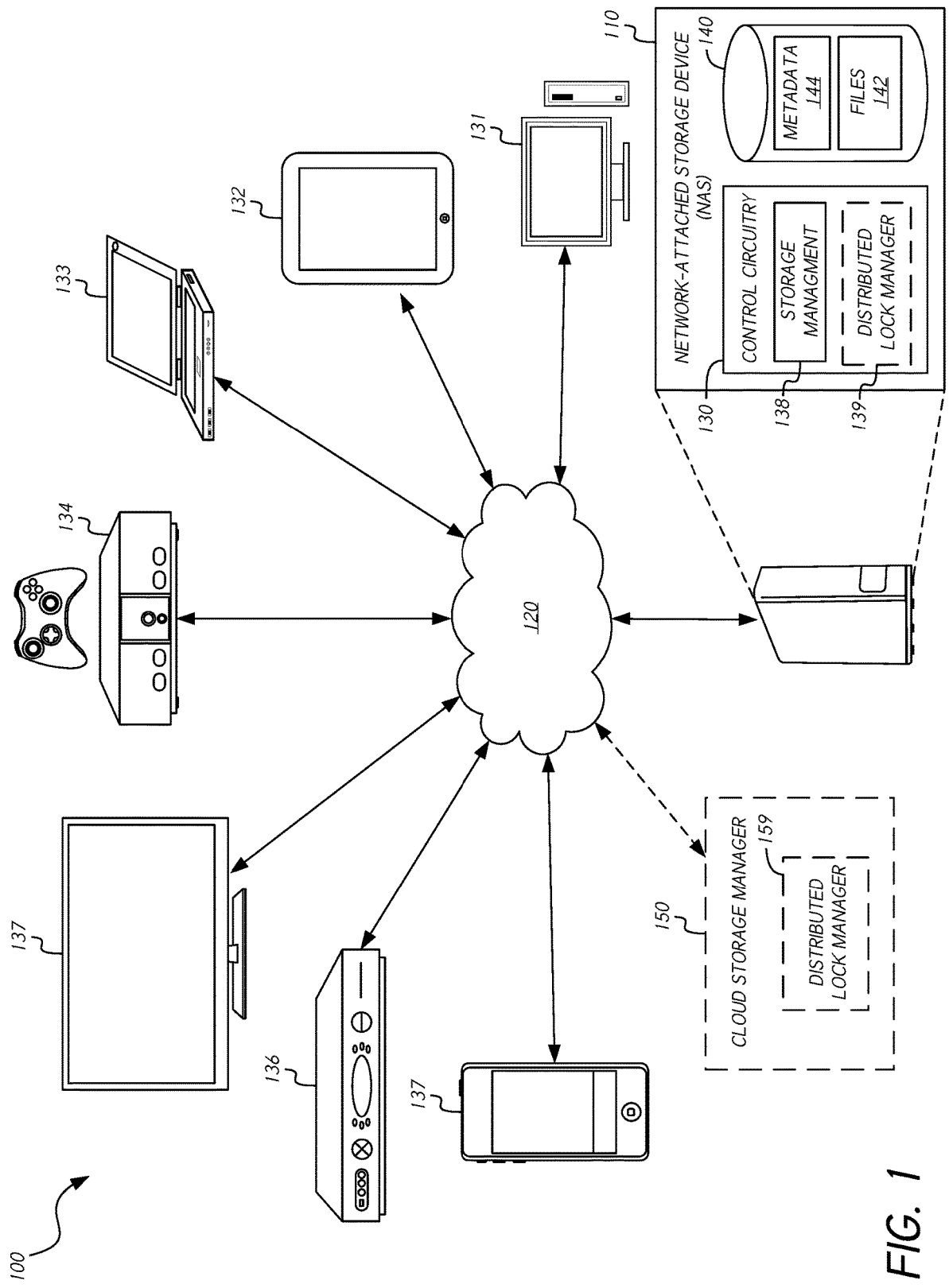
FIG. 1 is a diagram of a networked data storage system in accordance with one or more embodiments.

A NAS may include hardware, software, or a combination of such elements, configured such that the NAS operates as a file server. FIG. 1 is a diagram illustrating an embodiment of a NAS system 100, in which a network-attached storage device (NAS) 110 is communicatively coupled to one or more client devices over a network 120. The NAS 110 may provide file-based, or object-based, data storage services to devices coupled to the network 120. Types of client devices that may have access to the NAS 110 can include phones 137, such as smartphones, cable set-top boxes 136, smart TV's 135, video game consoles 134, laptop computers 133, tablet computers 132, desktop computers 131, wearable computers (not shown) and/or other network-connected computing devices. The network 120 may be a local area network (LAN), a wide area network (WAN) (e.g., the Internet), or other type of computer network, and the connections between the various client components of the system 100 and the network 120 may be either wired or wireless.

While certain embodiments are described herein in the context of NAS devices/systems, it should be understood that references herein to NAS's may refer to other types of data storage devices/systems, such as any type of computer device implementing software allowing for data storage access over a network. Furthermore, some embodiments disclosed here may be implemented using data storage device connections that are not over a network, but rather direct client/server connection.

In certain embodiments, the NAS 110 may be configurable over the network 120 by a client device interface, such as a web browser of a mobile or desktop computing device. An operating system (e.g., a relatively low-level operating system, such as FreeNAS) may be implemented in the NAS 110 by a control circuitry 130 thereof. The NAS 110 may provide access to files 142 using one or more network file-sharing protocols, such as NFS, SMB/CIFS, AFP, or the like. The NAS 110 may comprise a data store 140 for storing user data (e.g., files) 142, metadata 144, such as system tables or the like, and/or other types of data. The data store 140 may comprise one or more non-volatile memory devices or modules, and may include any type of data storage media (e.g., solid-state, magnetic).

The NAS 110 may be configured to implement encryption for user data/files 142 stored in the data store 140. For example, the NAS 110 may implement Transport Layer Security (TLS), Secure Sockets Layer (SSL), and/or Advanced Encryption Standard (AES) keys (e.g., 256-bit, 128-bit, etc.) to protect files in rest and/or in motion. The NAS 110 may further be configured to implement one or more additional security features, such as user verification, forward secrecy, and/or the like.

As referenced above, the NAS 110 can provide shared access to files/data 142 stored on the NAS. For example, any of a plurality of clients may request, over the network 120, access to a file. Such clients may make modifications to the files for storing in the data store 140 of the NAS 110. However, where a first client accesses an editable file, it may be desirable to ensure that a subsequent client that accesses the file does not modify the original file accessed by the first client in an inconsistent manner. That is, it may be desirable for the NAS 110, or other network-connected entity (e.g., cloud storage manager 150), to implement file access protection/management to resolve issues associated with shared resource contention. Although shared data 142 is described herein in the context of files, it should be understood that the data 142 may be any shared resource maintained by the NAS 110 and accessible over the network 120. Furthermore, although certain principles and embodiments are described herein in the context of modification/management of files, it should be understood that such principles and embodiments may be applicable to any type of data structure, including objects, chunks, blobs, or the like.

Managing the synchronization and/or access to shared resources (e.g., files, or sub-files) can at least partially prevent various types of invalid and/or undesirable/unacceptable outcomes of resource contention and provide file consistency. In some systems, file consistency for shared storage is facilitated through the implementation of distributed lock management functionality. For example, the NAS 110 may be configured to implement a distributed lock manager 139, or such functionality may be implemented by a separate network-connected cloud storage manager 150, or other entity. Managing file locks (and/or sub-file locks) can prevent clients from making inconsistent modifications to a file and/or inadvertent data loss.

The distributed lock manager 139 may be designed to organize and/or serialize the access to the files 142 stored in the shared storage 140 of the NAS 110. The distributed lock manager 139 may place a lock on a file/resource when the file/resource is accessed by a client in an editable mode. When a client attempts to access a file that is locked, the NAS 110 may be configured to allow access to the file in a read-only mode. The distributed lock manger (139 or 159) may implement resource locking according to any suitable or desirable level of granularity. In certain embodiments, client devices may receive and/or maintain resource lock data locally for managing shared resource access.

Although certain implementations of distributed locking management in a shared data storage system may facilitate serialized access to files, such embodiments may not allow for concurrent modification of a file by multiple clients. Furthermore, implementation of distributed lock management may be processor-intensive and/or may be subject to strict timing dependencies, which may lead to data corruption or deadlock. In certain embodiments, the system 100 does not implement distributed locking of shared resources (e.g., files). For example, certain embodiments disclosed herein provide for management of access to shared resources (e.g., files) using partial-edit files, as described in detail below. Use of partial-edit files may facilitate maintenance of data integrity and file consistency for file access by multiple clients. Furthermore, partial-edit file processes, as described herein, may allow for partial edits to files with little or no risk of inconsistent edits.

In some data storage systems, a client can only modify the entire content of a file or resource. For example, in order to modify a file stored in the NAS 110, it may be necessary in some implementations to download the entire file from the NAS 110, modify the file locally, and re-upload the entire file to the NAS 110. Requiring the download of the entire file/resource to the client for editing, rather than merely downloading the segment/portion that is to be modified, may help prevent inconsistency issues caused by multiple clients attempting to modify different segments/portions of the file at the same time. However, downloading and re-uploading entire files can present bandwidth issues, and the latency associated with downloading the file may be undesirable. For example, access to data may be limited by the upload speed of the NAS 110, which may depend on the network connection of the NAS (e.g., WiFi, Ethernet, etc.). When accessing large files, the bottleneck created by the NAS upload speed may lead to undesirable delays. For home-based network-attached storage devices/systems, bandwidth concerns may be particularly prominent.

In some implementations, the present disclosure provides for the editing of partial segments/portions of files by a client (or multiple clients concurrently) without the risk of conflicting edits to different segments/portions of the files through the use of partial-edit files, as described in detail below. Therefore, use of partial-edit files in accordance with the present disclosure may allow for clients in a network-attached data storage system to download and re-upload only portions of a file, rather than the entire file, when making file modifications, while ensuring consistency of edits in the file.

In some implementations, the present disclosure relates to devices, systems, and methods for managing shared file modification and/or modifying existing files partially without requiring re-uploading of the entire file. The principles disclosed herein provide a mechanism for modifying existing files in a data storage server or device consistently through the use of partial-edit files, which may comprise a copy of an original file being modified. In certain embodiments, when a client requests a file, the NAS 110 may create a copy of the file, wherein modifications to the file, or portion thereof, are initially applied at the NAS 110 to the copy of the file (i.e., partial-edit file). The edits in the partial-edit file may ultimately be applied to the original file, such as in connection with an indication to commit the edits. The commitment of the partial-edit file may involve replacing the original file with the entire content of the partial-edit file. Use of partial-edit files may allow for a client to implement resumable uploads of new files, and partial writes to existing files, on a remote shared data storage system without the use of distributed locks. In certain embodiments, the creation and management of partial-edit files between the NAS 110 and client device(s) may be implemented over a representational state transfer (REST) application programming interface (API). Embodiments disclosed herein advantageously provide the ability to remotely and concurrently create, access, and modify files consistently.

Partial-Edit Files

Figure 2:
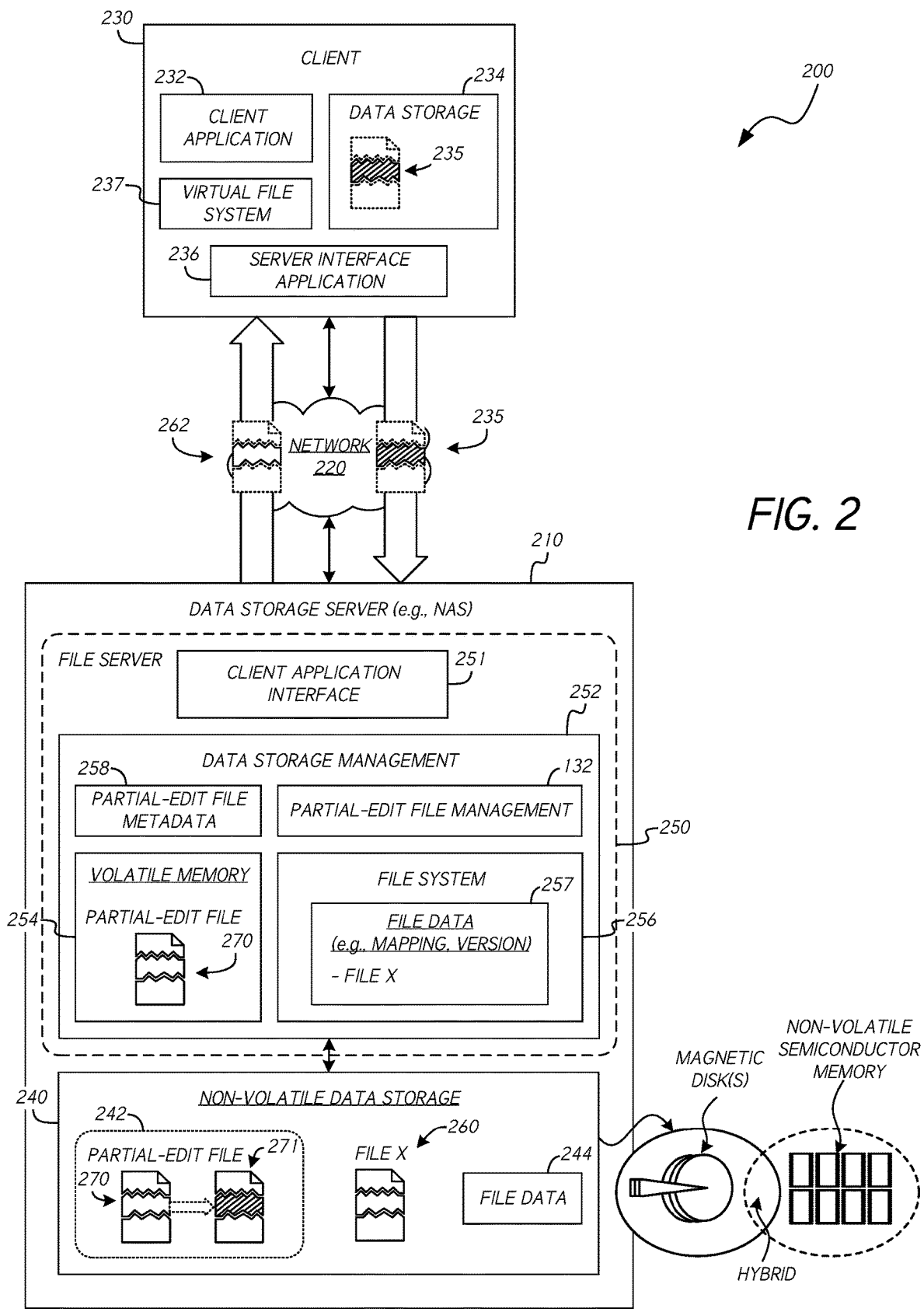
FIG. 2 is a diagram of a data storage system in accordance with one or more embodiments.

FIG. 2 is a block diagram illustrating a data storage server 210, such as a network-attached storage device (NAS), according to an example embodiment. The data storage server 210 may represent an embodiment of the NAS 110 of FIG. 1. Although the storage server 210 may represent any type of data storage server device or system, the storage server 210 may be described below in certain contexts as a NAS for illustration purposes. Referring to FIG. 2, the data storage server (e.g., NAS) 210 may include certain control circuitry or components configured to implement a file or object server. For example, the illustrated embodiment of FIG. 2 comprises control circuitry functional modules and components including a file server 250, client application interface 251, data storage management module 252, file system 256, file data 257, volatile memory 254, partial-edit file management module 132, and partial-edit file metadata 258. Although the control circuitry of the data storage server 210 is illustrated as various separate modules, it should be understood that the functionality represented thereby may be implemented using any configuration of modules or control circuitry. Although the principles disclosed herein are applicable to an object server, the description below is presented in the context of a file server for illustration purposes.

In certain embodiments, the system 200 may be designed to preserve the integrity of file content stored in non-volatile data storage 240 of the data storage server 210. The system 200 may allow for the downloading by the client 230 of parts or sub-segments of an existing file stored in the data storage 240 of the data storage server 210, wherein the client 230 may make modifications to the file portion and re-upload the modified file portion without having to download/upload the entire file.

The data storage server 210 includes non-volatile memory data storage 240. The data storage 240 may comprise one or more disks, wherein the NAS 210 further comprises one or more heads (not shown) actuated radially over the disk(s), and a spindle motor for rotating the disk(s). Alternatively, or in addition, to magnetic (or optical) rotating media, the non-volatile data storage 240 may comprise solid-state memory and/or other non-volatile memory, such as MRAM and/or phase change memory, or the like. In certain embodiments, the data storage server 240 may comprise one or more hybrid hard drives including both magnetic media and solid-state media. In addition to the illustrated modules and components, the data storage server 210 may further include one or more additional network interfaces, processors, data and/or power communication buses, memories, boards, chips/dies, or the like.

According to one embodiment, the data storage server 210 may store a file 260 ('file X') in the non-volatile data storage 240. The file 238 may comprise, for example, audio content, video content, textual content, or mixed or other type of content. The data storage server 210 may implement a file system 256. With respect to object-storage embodiments, the data storage server 240, or client device(s), may break files up into objects for storing, and put the objects back together to recreate the files. Although certain embodiments are described herein in the context of files, it should be understood that references to files herein may refer to any sub-segment of data, such as objects, pieces, shards, chunks, blocks, blobs, and the like, and may refer to sub-segments having any desirable size. In certain embodiments, the data storage server 220 may have no knowledge of the relationship between objects stored in the non-volatile data storage 240.

The data storage server 210 may comprise a NAS that may be, for example, a personal in-home box, which may be accessible by the client 230 either locally (e.g., over a LAN connection) or through a cloud-based connection. The client 230 may be configured to implement a server interface application 236 configured to communicate with the data storage server 210 according to a particular application programming interface (API). For embodiments in which the client 230 is a mobile computing device (e.g., smartphone), the server interface application 236 may be a mobile client application. The server interface application 236 may be configured to implement file/database syncing functionality in some embodiments. Where the client 230 is communicatively coupled to the data storage server 210 over a LAN connection, the client 230 may be configured to search for data storage server devices on the network 220, wherein such search may produce a list of all available devices based on, for example, IP address.

The file server 210 may receive data and storage access commands using a client application interface 251, which may be configured to communicate with the client 230 according to the relevant API (e.g., REST API). In certain embodiments, the client 230 utilizes a DNS server in communicating with the data storage server 210; the data storage server 210 may be callable through a web address URL (Uniform Resource Locator).

The client 230 may comprise control circuitry configured to implement the functionality of the illustrated modules/components thereof. The client 230 is configured to implement a virtual file system 237. The virtual file system implemented by the client 230 may be configured to retranslate data storage access requests from the client application 232 (e.g., word processor application) to be directed to the data storage server 210. The virtual file system 237 may send requests, as translated by the server interface applications 236 for communication according to the relevant API, via the network 220 to the data storage server 210. The responses from the data storage server 210 may be translated by the server interface application 236 according to the API, passed to the virtual file system 237, and further passed to the client application 232. Storage access commands communicated by the server interface application 236 may include write and read commands issued by the virtual file system 237. The storage access commands may specify an LBA, or range of LBAs, according to the file system 256, and the file server 250 may execute the received storage access commands in the non-volatile data storage 240. The file server 250 may be comprised of control circuitry configured to perform the functionality of the various modules/components associated therewith.

In some embodiments, the connection between the client 230 and the data storage server may be wired, such as through Ethernet, USB, or other connection, or may be wireless, such as through WiFi, Bluetooth, or other wireless connection. In certain embodiments, the connection between the client 230 and the data storage server 210 is achieved over the Internet, wherein each of the client 230 and the data storage server 210 is connected to the Internet over a wired or wireless connection.

The data storage server 210 may be configured to implement data redundancy, wherein copies or portions of user data stored in the data storage 240 are maintained in one or more internal and/or external drives. For example, the data storage server 210 may implement redundant array of independent disks (RAID) technology, wherein the non-volatile memory array 240 includes a plurality of internal drives, disks, or other data storage partitions combined into a logical unit for the purposes of data redundancy and performance improvement. In addition, or alternatively, the data storage server 210 may be configured to implement RAID using one or more internal memory modules in combination with one or more external memory devices. Furthermore, data may be distributed across the RAID memory modules/drives according to any desirable or practical RAID level, depending on the level of redundancy and/or performance desired. For example, the data storage server 210 may be configured to implement RAID 0, RAID 1, RAID 5, RAID 10, or other RAID technology, depending on data reliability, availability, performance and/or capacity considerations or requirements.

As described above, in some implementations, data storage server systems require that a client download an entire file, modify the file locally, and re-upload the entire fire to the data storage server in order to promote file edit consistency. However, such implementation may put undesirable constraint on system resources, particularly in home-based network-attached storage device systems. In some embodiments, the system 200 may advantageously provide for file edit consistency while also allowing for partial download/upload for file edits by the client.

The system 200 may advantageously provide file editing consistency through the use of partial-edit files, as described in detail herein. In some implementations, a partial-edit file comprises an at least partial copy of a file existing in the non-volatile data storage 240, or newly created by the client 230. When the client 230 indicates a desire to access a file (e.g., file X 260), the client and/or data storage server 210 may be configured to create a copy (e.g., partial-edit file 270) of at least a portion of the file, which may be stored in the non-volatile data storage 240 (e.g., in a temporary storage space or partition 242). When the client 230 makes modifications to the file, the modifications may be initially reflected in the partial-edit file 270. Although the partial-edit file 270 is shown as maintained in the non-volatile data storage 240, in some embodiments, the partial-edit file is maintained in volatile memory 254 of the data storage server 210.

In some embodiments, the creation of the partial-edit file may be directed by the client 230, such as by the client application 232, virtual file system 237 and/or server interface application 236. For example, the client 230 may be configured to send commands to the data storage server 210 to create partial-edit files. Alternatively, in some implementations, the data storage server 210 may be configured to direct partial-edit file creation in response to conventional data storage access commands received from the client. In some embodiments, partial-edit files are not accessible through the file system 256 maintained by the file server 250.

The data storage server 210 may implement a file system 256 that may be accessible by the client 230 through the server interface application 236 for browsing and/or searching. For example, the non-volatile data storage 240 may comprise some number of fixed-size data segments of data storage (e.g., blocks). The non-volatile data storage 240 may be configured to process relatively simple data access commands, wherein such commands are received from the file server 250 over a communication interface (e.g., Integrated Drive Electronics (IDE), Small Computer System Interface (SCSI), Serial ATA (SATA), or the like). The file system 256 may implement files, file directories, and/or other data structures that represent data stored in the non-volatile data storage 240. In certain embodiments, the file system 256 maintains certain metadata (e.g., tables) for associating logical files with physical block numbers, or the like. For example, the file mapping/version data 257 may comprise a file allocation table (FAT) that describes file/block associations. The file data 257 may further track unused blocks and/or allocate new blocks, as needed. The file system 256 may process data storage access requests from the client 230 via the client application interface 251 to access logical files, and may use the file mapping data 257 to locate the associated physical location in the data storage 240. The file system 256 may further maintain a file cache, which is used to buffer data written to, and/or read from, files of the file system. The file cache may be implemented using the volatile memory 254. The file data 257 may be maintained in the non-volatile data storage 240, and may be uploaded to volatile memory for use by the file system 250 and flushed (e.g., periodically) to allow for recreation of the file data after a power cycle.

The data and/or requests communicated between the client 230 and the data storage server 210 over the network 220 may be implemented through a particular communication protocol that both the server interface application 236 of the client 230 and the client application interface 251 of the data storage server 210 are designed to execute. For example, in an embodiment, the client 230 and data storage server 210 communicate according to a representational state transfer (REST) application programming interface (API), or other stateless interface, which may provide desirable interoperability between the system components over the network 220. The implemented API may allow for clients to utilize the file system 256 of the data storage server 210 by requesting files as network resources identified by, for example, a network address (e.g., Uniform Resource Locator (URL), Uniform Resource Identifier (URI), or the like). The requests communicated by the client 230 to the data storage server 210 may comprise, for example, HTTP requests (e.g., HTTP 1.1, HTTP/2).

The client 230 may comprise a server, a desktop, a laptop, a tablet, a handheld device, or the like, and may include control circuitry comprising one or more central processing units (CPUs), memory/data storage devices or modules, network interfaces, and/or input/output interface components, and the like. The control circuitry of the client 230 may be implemented to perform the functionality described herein. The control circuitry of the client 230 may be configured to execute certain software applications for implementing the functionality described herein, such as the client application 232. The application 232 may be executable within an operating system (OS) implemented by the control circuitry of the client 230. The data storage 234 may include one or more local storage devices, such as hard disks, flash memory modules, solid state disks, optical disks, and the like. In certain embodiments, the client 230 comprises a network interface for connecting to the network 220, which may include one or more network adapters (e.g., network interface cards (NICs)).

As described herein, the file server 250 may provide access to resources therein through a representational state transfer (REST) application programming interface (API) implemented by the client application interface 251. Accordingly, the file server 250 may be configured to invoke operations in the data storage server supported by REST API. The client application interface 251 may be configured to implement various API operations (e.g., REST API operations) that can be invoked by the client 230 through communication with the data storage server 210. API operations can include, for example, creation of, and/or access to, files associated with the file system 256 and partial-edit files, as described herein.

The client 230 may operate as a "client" and data storage server 210 may operate as a "server" in a REST architecture. As is known in the art, REST provides a software architecture for creating scalable web services. In a REST architecture, the functionality of the "client" can be separated from the functionality of the "server." Communication between the client 230 and server 210 may be through the REST API. In general, the client/server techniques described herein can be used in any system having a similar REST architecture having one or more clients (client computing systems) communicating with one or more servers (server computing systems), each server implementing a REST API through which clients can invoke API operations. Each API operation can be any type of service, application, or the like that can be executed by the data storage server 210 on behalf of the client 230.

The file system 256 may be exposed to the client 230 through the client application interface 251. The client 230 may request access to a file (e.g., file X 260), or generate a new file, which may trigger creation of a partial-edit file (e.g., partial-edit file 270). In particular, the client application 232 and/or virtual file system 237 may request a portion 262 of the file 260. In connection with the request, the data storage server 210 may generate the partial-edit file 270.

The client application 232 may make certain modifications to the downloaded file portion 262, thereby generating a modified file portion 235. The modifications 235 may be uploaded to the data storage server 210 and applied to the partial-edit file 270, such that the partial-edit file 270 becomes a modified version 271 of the original file 260. In certain embodiments, the modified file data 235 may be achieved through the creation/maintenance of a base copy of the file portion 262 in addition to a copy patch reflecting the modifications to the base copy. The client 230 may emerge the copy patch with base copy to generate the modified file.

The client 230 or file server 250 may ultimately cause the modifications reflected in the modified partial-edit file 271 to be committed to the file 260. Commitment of the partial-edit file 271 may involve overwriting the file 260, or a portion thereof, with the partial-edit file 271. With respect to partial-edit files that represent newly-generated files, committing may simply involve writing the partial-edit file to the storage space of the non-volatile data storage 240 used for normal files and/or adding metadata for the file to the file data 257 of the file system 256. In certain embodiments, when the client 230 attempts to commit the partial-edit file 271, it may be determined whether the current version of the file 260 is the same as the version of the file on which the partial-edit file 270 was originally based. That is, it may be determined whether the version associated with the partial-edit file 270 is the current version of the existing file 260. For example, the partial-edit file 270 may be associated with version-identification information, such as etag information, or the like. For example, such information may be maintained by the data storage server 210 as part of the partial-edit file metadata 258. The client 230 and/or data storage server 210 may specify that partial-edit files are only to be committed if the versions match between the partial-edit file and the current version of the existing file on which the partial-edit file is based. If not, the client 230 and/or data storage server 210 may optionally force the commitment of the partial-edit file 271, or alternatively may save the partial-edit file 271 as a separate file or version of the existing file 260. In certain embodiments, the client application 232 or virtual file system 237 of the client 230 may determine what action is to be executed when the version associated with the partial-edit file 271 does not match the current version of the existing file 260.

Once the partial-edit file 271 has been committed, the partial-edit file 271 may be deleted. The frequency of execution of modifications in the partial-edit file and/or commitment of partial-edit files may be dependent on the client application 232 or virtual file system 237. For example, the frequency with which the client application 232 and/or virtual file system 237 access the file and/or read or write to the file may at least partially drive the execution of modifications in the partial-edit file 270 and/or commitment of the partial-edit file 271 to the original file 260. In certain embodiments, the client application 232 is configured to make system calls to the virtual file system 237. The client application 232 may therefore not direct the partial-edit file commit commands to the data storage server 210, but rather the virtual file system 237 may be configured to generate and/or provide the commit commands.

By maintaining the partial-edit file 270/271 over the duration of editing by the client 230, and committing all edits made during such period collectively at one time, the data storage server 210 can prevent client edits/modifications from being inconsistently applied to the file 260. Therefore, the system 200 may provide for the ability to remotely and concurrently create, access, and modify files stored in the non-volatile data storage 240 consistently.

The normal file 260 (file X) may be accessible to other clients concurrently in its original form while the partial-edit file 270 is being modified by the client 230. In certain embodiments, the file 260 is concurrently accessible by other clients without any locks and/or other protections. The file 260 may be generally immutable prior to commitment of a partial-edit file by a client. Furthermore, because edits uploaded by the client 230 are reflected and up-to-date in the partial-edit file 271, the system 200 advantageously provides for resumable uploads and partial writes to the partial-edit file 270/271, and ultimately to the file 260.

The partial-edit file 270 may be similar to the file 260. For example, the partial-edit file 270 may comprise a data structure that is similar or identical to the data structure of the normal file 260. Alternatively, the partial-edit file 270 may comprise similar file content/user data as the normal file 260, but may be embodied in a different data structure or may have different metadata in certain metadata fields, or the like, vis-à-vis the normal file 260. In certain embodiments, while the normal file 260 is identified in, and accessible through, the file system 256, the partial-edit file 260 may not be accessible through the file system 256. For example, the normal file 260 may be accessible through filesystem browsing operations and searches, and may be persistent until deleted explicitly, while the partial-edit file 270 may be known only to the client that created it. Furthermore, the partial-edit file 270 may be inherently provisional in nature, and may be deleted as a matter of course when the edits reflected in the file are committed to the normal file 260.

The partial-edit file 270 may be stored in a temporary space or partition 242. In the temporary space, the file server 250 may execute modifications to parts of the file. The client 230 may upload file portions (e.g., file portion 235) to be executed in the partial-edit file 270, and may continue to edit/access the file from its modified state 271. While the client 230 and/or file server 250 can modify the file 270 in the temporary space 242, the modifications may not be committed until the application 232 is fully done modifying the file.

The client 230 may use API requests to view/access the portion 262 of the file 260. For example, with respect to REST API implementations, the client may provide to the data storage server 210 a request including, in addition to certain file-identification parameters (e.g., file ID, filename, etc.), the location in the file that the client application 232 wishes to access/edit. By only downloading the partial file 262, and likewise only uploading the partial file 235, the system 200 provides a file editing mechanism that advantageously reduces network bandwidth requirements compared to systems in which entire files are downloaded, modified locally, and re-uploaded by the client. When accessing the file 260, the application 232 (e.g., word-processing application) may request to access a random location in the file 260. In response, the file server 250 may provide to the client 230 only that portion of the file associated with the request. The client application 232 may show the relevant portion 262 of the file to the user, allow the user to edit that portion locally, and upload the edited portion 235 back to the file server 250 to be written to the partial-edit file 270 in an uncommitted state.

The partial-edit file 270 may be maintained in any suitable or desirable data storage of the data storage server 210. In addition, the client modifications reflected in the partial-edit file 271 may be committed to the normal file 260 in response to any suitable or desirable mechanism or event. For example, the client application 232, virtual file system 237, and/or server interface application 236 may explicitly request or signal to the data storage server 210 for the modified partial-edit file 271 to be committed to (e.g., overwrite) the normal file 260. The request by the client 232 to commit the partial-edit file 271 may be made according to a specific API (e.g., REST API) command. The command to commit the partial-edit file 271 may identify the partial-edit file in some manner, such as by file ID or the like. Therefore, as the partial-edit file 270/271 is known only to the client 230, other clients may be unable to commit the partial-edit file. In certain embodiments, metadata and/or other information associated with the partial-edit file may be made available to other clients in addition to the client 230. Once the partial-edit file 271 has been committed, it may be deleted by the client 230 and/or file server 250.

When the client application 232 attempts to commit the partial-edit file 271 to the normal file 260, the file server 250 may return a version identifier, or the like, associated with the current version of the file 260. For example, in some embodiments, during the duration of time between when the partial-edit file 270 was initially created and when the partial-edit file 271 is attempted to be committed, the file 260 may have been modified by another client or application. In such instance, the version metadata associated with the file 260 may have been updated to reflect a modified version of the file. Such information may be maintained in the file data 257 and/or file data 244. When the partial-edit file 270 is initially created, metadata indicating the version of the file 260 at the time of creation of the partial-edit file 270 may be maintained and/or provided to the client 230. When the client 236 wishes to commit the partial-edit file, a comparison may be performed by the client 230 and/or file server 250 to determine whether the current version of the file 260 matches the version of the file at the time of creation of the partial-edit file 270 (i.e., the version associated with the partial-edit file 270). If the versions do not match, the system 200 may not allow for the file 260 to be overwritten with the modified partial-edit file 271. Alternatively, the client 230 and/or file server 250 may save the modified partial-edit file 271 as a separate version of the file 260, or otherwise save the partial-edit file 271 in the non-volatile data storage 240 as part of the file system 256. In some embodiments, when the versions do not match, the modified partial-edit file 271 may be discarded without saving or committing the file and/or modifications associated therewith.

The version data maintained by the file system 256 (e.g., part of file data 257) may comprise any suitable or desirable data, such as an etag, or the like. For example, the version data may comprise fingerprint data, timestamp data, hash data (e.g., hash of the existing file content), or the like. When a partial-edit file is committed to the file system, the version (e.g., etag) associated with the file may be changed and maintained at such time and/or in association therewith. The version data may be maintained as part of the file data 257 and/or file data 244. In certain embodiments, the data storage management module 252 of the file server 250 may maintain certain metadata associated with partial-edit files, such as partial-edit file identifiers and data mapping such partial-edit file identifiers to existing files stored in the non-volatile data storage 240. Such metadata 258 may further comprise version identification information indicating a version of the existing file associated with a partial-edit file at the time of creation of the partial-edit file.

By executing edits/modifications in the partial-edit file 270, the system 200 allows for the collection of a batch or group of edits to a file in a working file that is separate and distinct from the original existing file 260, and for the collective commitment of such edits/modifications to the original file. With respect to newly-created files, a partial-edit file may be created prior to storing the file in the file system. Initially, the partial-edit file would not be associated with an existing file in the non-volatile data storage 240. When the initial commitment of the partial-edit file occurs, the normal file associated therewith may be generated and stored within the non-volatile data storage 240, and reflected in the file system 256.

As described in detail above, the partial-edit file 270 may comprise a full copy of the original file 260 in a separate location from the location where the file 260 is stored. Although embodiments disclosed herein are described in the context of files and partial-edit files, should be understood that the term "file" may be used herein to describe any type of data structure, such as any type of object or resource. In certain embodiments, partial-edit objects or chunks may be created and maintained that are editable copies of objects/chunks of data stored in the non-volatile data storage 240. For example, with respect to objects storage embodiments, partial download and upload of the user data stored in the non-volatile data storage 240 by the client 230 may involve the download of a chunk of a file, local modification thereof, and re-upload of the modified chunk, wherein the partial-edit file 270 maintained by the data storage server 210 may comprise an editable chunk.

The partial-edit file 270 may comprise any type of object or data structure, such as a file, or the like. In certain embodiments, the file server 250 maintains certain partial-edit file metadata 258, which may include one or more of filename, location, partial-edit file indicator, file directory, modification times, version, and/or other metadata. Where the partial-edit file is associated with an existing file in the non-volatile data storage 240, the partial-edit file metadata 258 may include a pointer or other identifier of the existing file with which the partial-edit file is associated. The partial-edit file metadata 258 may comprise a table or other data structure, for example. In certain embodiments, the content of the partial-edit file 270 may vary from that of the original file 260 in the sense that the two files are separate physical blobs or data stored in separate locations.

In certain embodiments, randomly reading and/or stating the partial-edit file 270 may be supported by the system 200. Concurrent writes/reads of the file 260 can be implementable because, in some embodiments, only one client may be able to access a given partial-edit file, such that the consistency of multiple writes by a client to a partial-edit file may be guaranteed by the fact that they are all from the same client, and to the same file (i.e., the partial-edit file).

Figure 3:
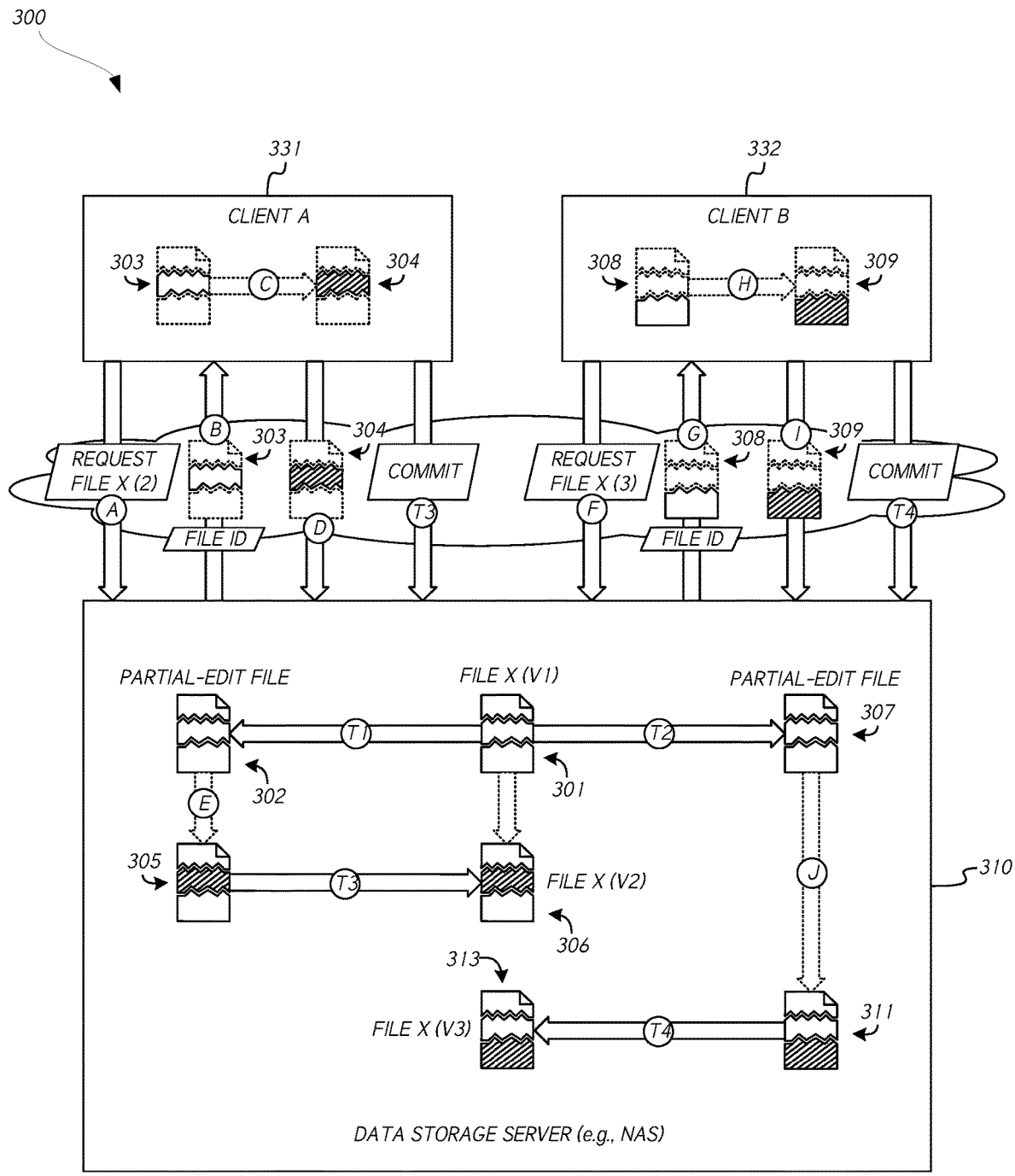
FIG. 3 is a diagram of illustrating a process for consistent concurrent file modification in accordance with one or more embodiments.

FIG. 3 illustrates an embodiment of a system 300 for concurrently modifying files in a shared data storage environment. The diagram of FIG. 3 illustrates a process 300 for modifying a file in a data storage server using partial-edit files, according to embodiments disclosed herein. The process diagram 300 illustrates various events, identified by circled-letter identifiers. It should be understood that although certain letter references are used to identify the various process events, such letter references do not necessarily imply temporal order of events, and such events may occur in any suitable or practical order.

In certain embodiments, the process 300 provides for the upload of new files and/or partial writes to existing files on a remote shared system over a particular application programming interface (API) (e.g., REST API), without the use of distributed locks. The process 300 may provide the ability to remotely and concurrently create, access, and/or modify files consistently.

According to the process 300, a client may create a new partial-edit file through a dedicated API, such as a REST API, or the like. For example, as shown as event (A), client A 331 may send a request for access to a portion (2) of a file (e.g., 'file X'), stored at the data storage server 310. For example, the request may be for a first version (V1) of file X, as illustrated. The first version (V1) may be a current version of file X at a period in time (T1). The request for file X may be associated with a command to create a partial-edit file of file X. In response to the request from client A, the data storage server 310 may create a partial-edit file 302 at a first period in time (T1). The partial-edit file 302 may be a full or partial copy of file X, and may be stored in any data storage of the data storage server 310, such as in a temporary space or partition of a non-volatile data storage module in which the original file is maintained.

In response to creation of the partial-edit file 302, the data storage server 310 may provide back to client A 331 the requested portion 303 of the file, which may be read from the original file 301, or from the partial-edit file 302 at the data storage server 310. Although the provided file portion 303 is illustrated as a portion of a file, should be understood that, in certain embodiments, the client A 331 may request the entire partial-edit file 302, wherein the data storage server 310 may provide a full copy of the partial-edit file 302 to the client 331. In addition to the requested file, the data storage server may provide to the client 331 a file identifier (e.g., file ID) identifying the new partial-edit file in some manner. The file ID provided to client A 331 may be associated specifically with the partial-edit file 302 created by the client 331 and/or in response to a specific request from the client 331. Therefore, the file ID for the partial-edit file 303 may be known by the client 331. However, other clients (e.g., client B 332) communicating with the data storage server 310 may have no way to interact with the partial-edit file 302 because they may have no way to search partial-edit file identifiers.

The file portion 303 provided to client A 331 may comprise a one or more chunks or portions of the partial-edit file 302. Once client A 331 has downloaded the file portion 303, client A 331 may edit/modify the file portion 303 to generate a modified file portion 304, as shown. The modified file portion 304 may then be uploaded to the data storage server 310 in order to edit the partial-edit file 302. For example, as shown as event (E), the data storage server 310 may modify or overwrite the partial-edit file 302 to generate a modified version of the partial-edit file 305. Such modified chunks/portions may be written to any location of the partial-edit file, including beyond the end of the file, and may be of any suitable or desirable size. In certain embodiments, the partial-edit file 302 may be truncated by the client 331.

According to the example process 300 illustrated in FIG. 3, a second client, client B 332, may also request access to file X 301. For example, as shown as event (F) in the diagram of FIG. 3, client B 332 may request a portion (3) of file X. Portion (3) of file X may be the same as, or at least partially different from, the portion (2) accessed by client A 331. In connection with the request for the portion (3) of file X, client B 332 may create a partial-edit file 307 based on the original state 301 of file X (i.e., version V1). In some embodiments, the creation of the partial-edit file 307 may be in response to an explicit command from client B 332 to create the partial-edit file 307. Alternatively, the data storage server 310 may be configured to generate the partial-edit file 307 in response to a data storage access request received from client B 232, or some other event. The creation of the partial-edit file 307 may be at a second period in time (T2), which may be before or after the first period of time (T1). That is, it should be understood that although references T1 and T2 are used, such indicators do not necessarily imply temporal order of the referenced time periods.

In response to the file request received from client B 332 in connection with event (F), client B 332 may download from the data storage server 310 the requested portion (3) 308 of the file (e.g., file 307 or file 301). Once downloaded, the client 332 may modify/edit the downloaded portion 308 to generate a modified file portion 309. At event (I), the illustrated process 300 may involve uploading, by client B 332, the modified file portion 309 back to the data storage server 310 in order to effect corresponding modifications to the partial-edit file 307. For example, as shown as event (J), the data storage server 310 may update the partial-edit file 307 to reflect the uploaded modifications 309, resulting in the updated partial-edit file 311.

When client A 331 is done modifying the file 305, the client 331 may commit the partial-edit file 305, as described in detail above. In certain embodiments, the commit operation may automatically convert the partial-edit file 305 to a normal file 306, thus making the file, as edited, visible to other clients in the shared storage system. Furthermore, the committed file 306 may become immutable. As shown in the diagram FIG. 3, client A 331 may send a commit command to the data storage server 310, or otherwise indicate to the data storage server 310 that the partial-edit file 305 is to be committed. In certain embodiments, the data storage server 310 may implement partial-edit file commitment of its own volition according to some mechanism or protocol. For example, the data storage server 310 may be configured to periodically commit partial-edit files, or partial-edit file commitment may be triggered by an event of some kind. As shown, the indication or event associated with committing the partial-edit file 305 may occur at a time period (T3). Before committing the partial-edit file 305, it may be determined, by either or both of the client 331 and the data storage server 310, whether the version of file X associated with the base partial-edit file 302 matches a current version of file X. For example, where the partial-edit file 302 was generated based on a version (V1) of file X 301, if, at time period (T3), file X has not been modified, then it may be considered safe to overwrite the file version (V1) of file X 301 with the partial-edit file 305, or portion thereof, to generate the updated version (V2) of file X 306, as shown.

As client B 332 has also generated a partial-edit file 307 based on the version (V1) of file X 301, if client B 332, subsequently to the time period (T3), attempts to commit the updated partial-edit file 311, execution of said committing by overwriting the file X 306 may result in file modification inconsistency and/or data loss. For example, the committed modifications of the partial-edit file 305 made by client A 331 may be lost if the updated version (V2) of file X 306 is overwritten by subsequent committing of partial-edit file modifications generated by another client, such as client B 332. Therefore, where client B 332 provides a commit command, or otherwise triggers or indicates a committing of the partial-edit file 311, it may be determined whether the current version of file X is consistent with the version (V1) of file X 301 on which the partial-edit file 307 was based. As shown, the events associated with the committing of the partial-edit file 311 may occur at or after a time period (T4), wherein the time period (T4) is subsequent to the time period (T3). Therefore, at the time period (T4), the current version of file X may be represented by version (V2) 306, which includes the modifications generated by client A 331. Therefore, if the version of the file 306 is determined at time period (T4) and compared against the version (V1) of file X 301 on which the partial-edit file 307 was based, it will be determined that the versions of file X are not consistent. Therefore, in certain embodiments, completion of the committing of the modified partial-edit file 311 by overwriting file X 306 may be prevented.

In some embodiments, when it is determined that the file versions between the partial-edit file 307 and the current version of file X 306 are inconsistent, the data storage server 310 and/or the client 332 may allow for selection of one of a plurality of options for how to address the inconsistency. One option may be, for example, to abandon the commit of the partial-edit file 311 and/or delete the partial-edit file 311, and provide notification of the same to the client 332 and/or user interface associated therewith. Another option that may be implemented when file version inconsistency exists may involve saving a new file 313 comprising a separate modified version (V3) of file X 313 incorporating the edits of the partial-edit file 311, as shown in the diagram of FIG. 3. As another option, when the file versions are inconsistent, the data storage server 310 and/or client 332 may force the overwriting of the file 306 with the modified partial-edit file 311 and/or portions thereof. Another option for addressing a version inconsistency may involve re-fetching the base file (e.g., the current version of file x) and reapplying the modifications to the current version of the file (e.g., applying the modifications of partial-edit file 311 to the updated version (V2) of file X 306). Certain other options for resolving file version inconsistency not disclosed explicitly herein may be apparent to those having ordinary skill in the art.

The data storage server 310 may provide an indication to the client 332 that the file states are inconsistent, and allow the client 332 to implement whatever responsive action is desired. Such responsive action may be directed by user input, or may be according to a responsive scheme or protocol. In certain embodiments, client A 331 may dictate whether overwriting of the file 306 is permitted. In certain embodiments, client B 332 is not informed that client A 331 has accessed the file 301 until time period (T3) when client A 331 commits the edits of the partial-edit file 305, or until time period (T4) when client B 332 attempts to commit the partial-edit file 311. Once client A 331 has committed the partial-edit file 305, the version of the original file is updated to reflect the new version (V2) 306, of which client B 332 may be informed at time period (T4) when client B 332 attempts to commit the partial-edit file 311. When client B 332 determines that the version of file X has changed, it may re-check-out file X 306 and reapply the modifications to the portion of the file 308 in a newly-generated partial-edit file. Alternatively, client B 332 may report to the user the existence of the conflict and provide options for addressing the conflict to the user. In the system reflected in FIG. 3, the clients 331, 332 may not necessarily be considered to check-out the original file 301 when accessing a portion thereof, but rather may simply generate partial-edit file copies based thereon and edit such copies in a resumable fashion.

The illustrated process 300 ensures that the current version of file X contains only consistent changes in the file that have been made by one client, even where multiple clients have performed modifications concurrently. For example, as shown in FIG. 3, although both client A 331 and client B 332 are able to modify file X 301 concurrently, through modification of partial-edit files based thereon, the collection of edits in the respective partial-edit files, and batch commitment thereof, may prevent the intermixing of edits generated by client A 331 with those generated by client B 332. That is, although multiple clients may be performing edits on copies of the original file, since each client is editing a separate copy, the edits are not merged together, thereby preserving file consistency. The implementation of partial-edit files may be particularly suited for data storage environments that have limited processor and/or memory resources, but possibly an abundance of non-volatile storage space, such as disk space, or the like.

Figure 4:
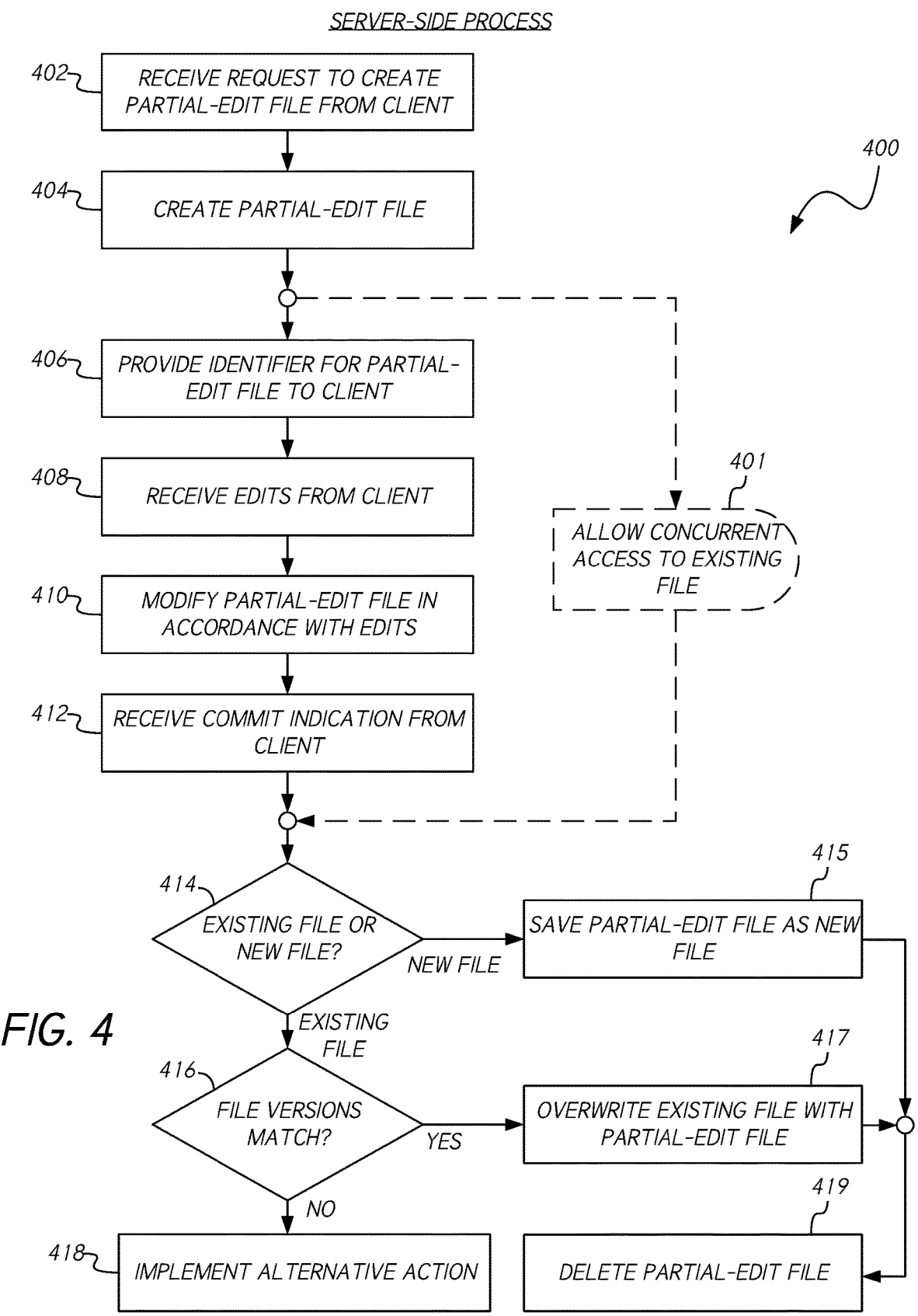
FIG. 4 is a flow diagram illustrating a process for managing partial-edit files in accordance with one or more embodiments.

FIG. 4 illustrates a process 400 for managing partial-edit files according to one or more embodiments of the present disclosure. At least some of the steps of the process 400 may be implemented at least in part by a data storage server device or system coupled to one or more clients over a network connection. At block 402, the process 400 involves receiving a request to create a partial-edit file from a client. For example, the step of block 402 may involve receiving an explicit command from the client to create a partial-edit file, or another type of request or command to access a file or portion thereof stored in non-volatile data storage of the data storage server.

At block 404, the process 400 involves creating a partial-edit file. For example, the partial-edit file may be a substantial copy of at least a portion of a file accessed by the client for modification thereof. Alternatively, partial-edit file may be representative of a new file created by the client.

At block 406, the process 400 involves providing identifier information associated with the partial-edit file to the client. For example, the identifier information may comprise a file ID and/or storage location information associated with the partial-edit file. The identifier information may further indicate an identifier and/or location of an existing file on which the partial-edit file is based.

At block 408, the process 400 involves receiving edits to at least a portion of the file from the client. For example, in certain embodiments, the process 400 involves uploading to the client at least a portion (e.g., one or more chunks) of a file associated with the partial-edit file. The client may edit the file or portion thereof and provide such edits to the server over a network connection.

At block 410, the process 400 involves modifying the stored partial-edit file in accordance with the edits received from the client. Therefore, the partial-edit file stored at the data storage server may reflect the client's edits. At block 412, the process 400 involves receiving a commit command or indication from the client to commit the partial-edit file to the client-accessible file system of the data storage server.

If the partial-edit file is associated with an existing file of the data storage server database, the process 400 may allow for concurrent access to the file by multiple clients during each of the steps of blocks 406-412, and/or during any other step of the process 400, as represented by the block 401 of the diagram of FIG. 4.

If the partial-edit file is associated with a newly-generated file by the client, the process 400 may proceed to block 415, which involves saving the partial-edit file, or content thereof, as a new file or portion thereof. Alternatively, if the partial-edit file is based on an existing file in the server data store, the process 400 may further involve determining whether the version of the existing file on which the partial-edit file is based matches a current version of the file. The determination of block 416 may occur at any point in the process 400 and/or in any manner. Furthermore, the determination of whether the file versions match may be performed by the client or server, and may be based on information communicated between the server and client.

If the file versions match, the process 400 may proceed to block 417, where the existing file may be at least partially overwritten with the partial-edit file, or content thereof. Such operation may result in an updated version of the existing file. In certain embodiments, it is incumbent on the client to determine version information and whether the partial-edit file, as modified, is inconsistent with other modifications to the original file. Once the partial-edit file has been committed, either in accordance with block 415 or block 417, the process 400 may proceed to block 419, where the partial-edit file may be deleted.

If it is determined that the file versions do not match, the process 400 may proceed to block 418, where any suitable or desirable alternative action may be implemented. For example, possible actions that may be implemented in accordance with block 418 may include forcing the commitment of the partial-edit file, saving a new version or copy of the existing file, abandoning the partial-edit file and/or edits associated therewith, or providing one or more errors or messages to the client device or system. In certain embodiments, the action of block 418 may be directed by the client. Furthermore, the determination at block 416 may further be performed by the client, wherein process steps associated therewith may be directed at least in part by the client. The data storage server may maintain incremental versions of the original file, such that the clients and/or server may re-fetch or access older versions of the file as desired.

The process 400 may allow for concurrent modification without locks. Therefore, by not requiring server-managed lock functionality and/or processes, the process 400 may provide improved efficiency with respect to cost and/or resource utilization. Furthermore, the process 400 may facilitate file consistency by preventing inconsistent modifications from different clients in a single file, as all changes committed to the database may be from a single user only.

Figure 5:
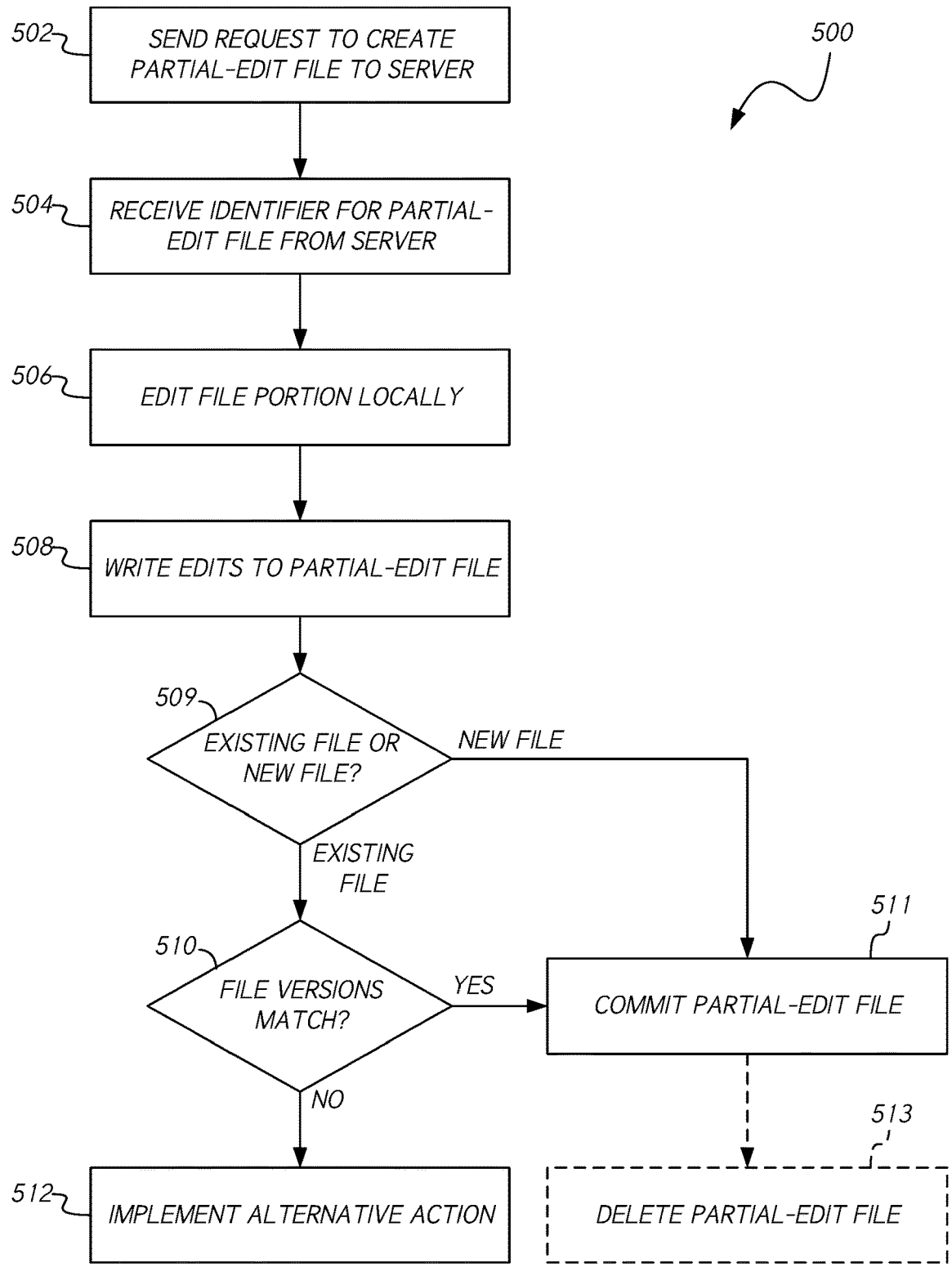
FIG. 5 is a flow diagram illustrating a process for managing partial-edit files in accordance with one or more embodiments.

FIG. 5 is a flow diagram illustrating a process 500 for modifying a file in a shared storage environment in accordance with one or more embodiments. At least some of the steps of the process 500 may be implemented at least in part by a client device or system coupled to a data storage server over a network connection.

At block 502, the process 500 involves sending a request to create a partial-edit file to a data storage server. For example, the request may be an explicit command to create a partial-edit file, or may be a data storage access command indicating a file or portion thereof that the client wishes to access from the data storage server. In some embodiments, the data storage server is configured to create the partial-edit file in response to such a command/or request. The partial-edit file may be initialized as an at least partial copy of the file the client wishes to access and modify. The file content of the file the client wishes to access may effectively be duplicated at least in part and embodied in the newly-created partial-edit file.

At block 504, the process 500 involves receiving identifier information associated with a newly-created partial-edit file from the data storage server. At block 506, the process 500 involves editing/modifying file information received from the data storage server. For example, the data storage server may provide a file or portion thereof in response to a data storage access request, such as the request of block 502. That is, the client and server may be configured to implement partial-file access and/or modification according to embodiments disclosed herein.

At block 508, the process 500 involves writing the edits to the partial-edit file stored at the data storage server. While the partial-edit file is being modified by the client, the original normal file on which the partial-edit file is based may still be accessible in a consistent manner by one or more other clients. Such other clients may not have access to, or visibility of, the partial-edit file being modified by the client, as such modifications may be in an inconsistent state with respect to modifications of the original file by other clients and/or other versions of the original file. Concurrent modifications of the original file by multiple clients may be enabled, wherein each client may modify a separate partial-edit file based on the original file.

If the partial-edit file is associated with a newly-generated file by the client, the process 500 may proceed to block 511, which involves committing the partial-edit file to the file system maintained by the data storage server. Committing the partial-edit file may involve saving the partial-edit file, or content thereof, as a new file or portion thereof in the file system.

If the partial-edit file is associated with an existing file in the server database, the process 500 may further involve determining whether the version of the existing file on which the partial-edit file is based matches a current version of the file. The determination of block 510 may occur at any point in the process 500 and/or in any manner. Furthermore, the determination of whether the file versions match may be performed by the client or server, and may be based on information communicated between the client and the server. In certain embodiments, it is incumbent on the client to determine what version of the original file is associated with the partial-edit file and/or with the current state of the original file in the database. For example, the client may rely on etags, or other version-identifying information. In certain embodiments, when the client attempts to commit the partial-edit file, the client may pass the version information (e.g., etag) associated with the partial-edit file, wherein the server is configured to determine whether the version passed by the client matches with the current version of the original file. Such determination by the server may be based on the version information passed by the client. In certain embodiments, the client may provide the version information independently of a commit command. By comparing the version information provided by the client with the current version information associated with the original file, the data storage server may determine whether the original file has changed since the partial-edit file was created, and may take measures to prevent the overwriting of previous modifications in the event that the versions do not match. If the versions do not match, the data storage server may return an error to the client so that the client can determine whether it is desired to force the overwrite, re-fetch the original file and reapply the modifications, and/or implement other action.

If the file versions match, the process 500 may proceed to block 511, where the partial-edit file may be committed to the database. For example, the existing file may be at least partially overwritten with the partial-edit file or content thereof. Such operation may result in an updated version of the existing file. Once the partial-edit file has been committed, the process 500 may proceed to block 513, where the partial-edit file may be deleted. In certain embodiments, the partial edit file is deleted by the server automatically in connection with the commit operation represented at block 511. That is, in certain embodiments, the process 500 does not include the step at block 513 as part of a client-side process.

If it is determined that the file versions do not match, the process 500 may proceed to block 512, where any suitable or desirable alternative action may be performed. For example, possible actions that may be implemented in accordance with block 521 may include forcing the commitment of the partial-edit file, saving a new version or copy of the existing file, abandoning the partial-edit file and/or edits associated therewith, providing one or more errors or messages to the client device or system, or to a user interface associated with the client. The action of block 512 may be directed by the client or the server, or both. Furthermore, the determination at block 510 may further be performed by the client or server, or both, wherein process steps associated therewith may be directed at least in part by the client, server, or both.

In some implementations, the client may request the deletion of the partial-edit file prior to committing the partial-edit file, which may serve to cancel previously-executed changes in the partial-edit file. In certain embodiments, the partial-edit file is automatically deleted by the server in connection with the commit operation, which may effectively promote the partial-edit file into a normal file system file.

Additional Embodiments

Those skilled in the art will appreciate that in some embodiments, other types of concurrent file modification systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A network-attached storage device (NAS) configured to enable concurrent modification of a stored file without using distributed locks, the NAS comprising:
   a non-volatile memory module;
   a network interface; and
   control circuitry coupled to the non-volatile memory module and to the network interface and configured to:
   connect to a first client over a network connection using the network interface;
   receive, from the first client, a request to access a first portion of an existing file stored in the non-volatile memory module;
   create, in the non-volatile memory module of the NAS, a first partial-edit file based on at least the first portion of the existing file;
   receive, from the first client, modifications associated with the first portion of the existing file;
   modify the first partial-edit file according to the received modifications; and
   at least partially overwrite the existing file with at least a portion of the first partial-edit file.

2. The NAS of claim 1, wherein:
   the control circuitry is further configured to receive, from the first client, a request to create the first partial-edit file; and
   said creating the first partial-edit file is performed in response to the request to create the first partial-edit file.

3. The NAS of claim 1, wherein the control circuitry is further configured to provide, to the first client, partial-edit file identifier information associated with the first partial-edit file.

4. The NAS of claim 3, wherein the first partial-edit file is not accessible to clients communicatively coupled to the NAS without the partial-edit file identifier information.

5. The NAS of claim 1, wherein the first partial-edit file is not referenced in a file allocation table maintained by the control circuitry.

6. The NAS of claim 1, wherein:
   the control circuitry is further configured to determine that a version of the existing file associated with the first partial-edit file matches a current version of the existing file; and said at least partially overwriting the existing file is based on the determination.

7. The NAS of claim 1, wherein the control circuitry is further configured to delete the first partial-edit file after said at least partially overwriting the existing file.

8. The NAS of claim 1, wherein the control circuitry is further configured to:
connect to a second client using the network interface;
receive, from the second client, a request to access a second portion of the existing file;
create a second partial-edit file based on the existing file in the non-volatile memory module of the NAS prior to said at least partially overwriting the existing file with the at least a portion of the first partial-edit file;
receive, from the second client, modifications associated with the second portion of the existing file; and
modify the second partial-edit file according to the modifications associated with the second portion of the existing file.

9. The NAS of claim 8, wherein the control circuitry is further configured to:
in response to said at least partially overwriting the existing file, update version information associated with the existing file to indicate an updated version; and
determine that a version of the existing file associated with the second partial-edit file differs from the updated version.

10. The NAS of claim 9, wherein the control circuitry is further configured to, in response to the determination that the version of the existing file associated with the second partial-edit file differs from the updated version, send a notification to the second client indicating that the existing file has changed.

11. The NAS of claim 1, wherein:
the request, from the first client, to access the first portion of the existing file comprises a target location in the existing file; and
the first partial-edit file created in the non-volatile memory module of the NAS comprises a partial portion of the existing file that includes the target location.

12. A computing device comprising:
a data storage module;
a network interface; and
control circuitry coupled to the data storage module and to the network interface and configured to:
connect to a data storage server over a network connection using the network interface, the data storage server configured to enable concurrent modification of a stored file without using distributed locks;
send, to the data storage server, a request for a portion of a file stored at the data storage server;
send a request to the data storage server to create, at a non-volatile memory of the data storage server, a partial-edit file based on at least the portion of the file;
receive, from the data storage server, the portion of the file;
store the portion of the file in the data storage module;
generate modifications to the portion of the file stored in the data storage module;
send, to the data storage server, the modifications to modify the partial-edit file at the data storage server; and
send, to the data storage server, a request to commit the partial-edit file.

13. The computing device of claim 12, wherein the control circuitry is further configured to receive, from the data storage server, partial-edit file identifier information identifying the partial-edit file.

14. The computing device of claim 13, wherein said sending the modifications to the data storage server comprises sending a command to the data storage server including the modifications and the partial-edit file identifier information.

15. The computing device of claim 14, wherein the command is a representational state transfer (REST) application programming interface (API) command.

16. The computing device of claim 12, wherein the control circuitry is further configured to receive, from the data storage server, a response indicating that a version of the file that is associated with the partial-edit file is different than a current version of the file maintained at the data storage server.

17. The computing device of claim 16, wherein the control circuitry is further configured to, in response to the response from the data storage server, force a commitment of the partial-edit file.

18. The computing device of claim 16, wherein the control circuitry is further configured to, in response to the response from the data storage server, save the partial-edit file as a new file.

19. The computing device of claim 12, wherein the control circuitry is further configured to, in response to the response from the data storage server, save the partial-edit file as a new version of the file.

20. The computing device of claim 12, wherein the control circuitry is further configured to, after sending the request to commit the partial-edit file, send a request to delete the partial-edit file.

21. A data storage server configured to enable concurrent modification of a stored file without using distributed locks, the data storage server comprising:
means for non-volatile storage comprising a user data space and a partial-edit file space separate from the user data space;
means for network communication; and
control circuitry coupled to the means for non-volatile storage and to the means for network communication, the control circuitry configured to:
maintain a client-viewable file system that references files stored in the user data space;
connect to a client over a network connection using the means for network communication;
receive, from the client, a new file not previously stored in the means for non-volatile storage;
create a partial-edit file in the partial-edit file space based on the new file in the means for non-volatile storage of the data storage server;
receive, from the client, modifications associated with the new file;
modify the partial-edit file in the partial-edit file space according to the received modifications;
copy the modified partial-edit file to the user data space as part of a new file system file; and
add, to the file system, a reference to the new file system file.

22. The data storage server of claim 21, wherein the control circuitry is further configured to receive, from the client, a request to create the partial-edit file, wherein said creating the partial-edit file is performed in response to the request to create the partial-edit file.

23. The data storage server of claim 21, wherein the control circuitry is further configured to provide, to the client, partial-edit file identifier information associated with the partial-edit file.

24. The data storage server of claim 21, wherein the control circuitry is further configured to delete the partial-edit file after said copying the modified partial-edit file to the user data space.

* * * * *